(12) United States Patent
Lee et al.

(10) Patent No.: US 11,936,944 B2
(45) Date of Patent: Mar. 19, 2024

(54) DISPLAY DEVICE

(71) Applicant: LG ELECTRONICS INC., Seoul (KR)

(72) Inventors: Changgi Lee, Seoul (KR); Dongyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 17/771,444

(22) PCT Filed: Oct. 24, 2019

(86) PCT No.: PCT/KR2019/014041
§ 371 (c)(1),
(2) Date: Apr. 22, 2022

(87) PCT Pub. No.: WO2021/080038
PCT Pub. Date: Apr. 29, 2021

(65) Prior Publication Data
US 2022/0400306 A1 Dec. 15, 2022

(51) Int. Cl.
*H04N 21/442* (2011.01)
*H04N 21/443* (2011.01)
*H04N 21/81* (2011.01)

(52) U.S. Cl.
CPC ......... *H04N 21/442* (2013.01); *H04N 21/443* (2013.01); *H04N 21/8173* (2013.01)

(58) Field of Classification Search
CPC . H04N 21/442; H04N 21/443; H04N 21/8173
See application file for complete search history.

(56) References Cited

U.S. PATENT DOCUMENTS

| 7,107,240 B1* | 9/2006 | Silverman | G06Q 40/00 |
| | | | 705/37 |
| 9,395,976 B2* | 7/2016 | Iijima | G06F 8/654 |
| 9,710,432 B2* | 7/2017 | Hashimoto | G06F 40/174 |
| 9,942,433 B2* | 4/2018 | Kano | G06F 8/61 |

(Continued)

FOREIGN PATENT DOCUMENTS

| JP | 2019174968 | 10/2019 |
| KR | 100645529 | 11/2006 |

(Continued)

OTHER PUBLICATIONS

PCT International Application No. PCT/KR2019/014041, International Search Report dated Jul. 17, 2020, 4 pages.

*Primary Examiner* — James R Sheleheda
(74) *Attorney, Agent, or Firm* — LEE, HONG, DEGERMAN, KANG & WAIMEY

(57) ABSTRACT

A display device includes: a display configured to display an execution screen of an application; a network interface configured to receive logging configuration information related to the application; and a controller. The controller is configured to: update the received logging configuration information in a configuration file; when an event for the execution screen of the application occurs, obtain logging item information for logging an operation of the event from the updated configuration file; and obtain log information related to the operation of the event by using the obtained logging item information.

18 Claims, 19 Drawing Sheets

(56) References Cited

U.S. PATENT DOCUMENTS

| | | | | |
|---|---|---|---|---|
| 2015/0318018 A1* | 11/2015 | Kaiser | ............. | H04N 21/47205 |
| | | | | 386/241 |
| 2016/0077783 A1* | 3/2016 | Kato | ....................... | G06F 3/147 |
| | | | | 345/2.1 |
| 2016/0337543 A1* | 11/2016 | Kano | .................. | G06F 21/6209 |
| 2019/0306262 A1* | 10/2019 | Fan | .................. | G06F 16/24575 |
| 2019/0306362 A1* | 10/2019 | Naya | .................. | H04N 1/00408 |

FOREIGN PATENT DOCUMENTS

| | | |
|---|---|---|
| KR | 1020170030285 | 3/2017 |
| KR | 20170045829 | 4/2017 |
| KR | 1020190021074 | 3/2019 |

\* cited by examiner

FIG. 14

```
▲<div role="button" data-webos-voice-intent="Select" data-component-id="zoombutton" aria-lavel="ENLARGE" tabindex="-1" calss="Button_button_Nr IconButton_iconButton_SBew- IconButton_iconButton_3U8Tc moonstone PhotoViewer_photoButton_3QbA0 PhotoViewer_iconButtonMargin_2NnXS spott IconVefore Button_large_2msKk "aria-disabled="false">...</div>
▲<div role="button" data-webos-voice-intent="Select" aria-label="SLIDE SHOW" tabindex="-1" class="Button_button_Nr6I4 Button_button_34KA3 IconButton_iconButton_3U8Tc moonstone PhotoViewer_photoButton_3QbA0 PhotoViewer_iconButtonMargin_2NnXS spottable large Button_translucent Button_large_2msKk" aria-disabled="false">...</div>
▼<div role="button" data-webos-voice-intent="Select" data-component-id="rotateButton" aria-label="rotation" tabindex="-1" class="Button_button_ IconButton_iconButton_SBew- IconButton_iconButton_3U8Tc moonstone PhotoViewer_photoButton_3QbA0 PhotoViewer_iconButtonMargin_2NnXS spott iconBefore Button_large_2msKk" aria-disabled="false">      511
    <div class="Button_decoration_1fsr1"></div>
    <div class="Button_bg_gXSwN Button_bg_1wMUu IconButton_bg_2ESHc"></div>
  ▲<div class="Button_client_307-W Button_client_2wLo_">...</div>
  </div>
</div>
```

FIG. 16

| 133 | "Press the blue button to hide or show the button guide. ": "파란색 버튼을 누르면 키 가이드를 |
| --- | --- |
| 134 | "Press the green button to zoom in. ": "녹색 버튼을 누르면 화면을 확대할 수 있습니다.", |
| 135 | "Press the yellow button to zoom out. ": "노란색 버튼을 누르면 화면을 축소할 수 있습니다.", |
| 136 | "Previous": "이전", |
| 137 | "REWRITE FILE": "파일 덮어쓰기", |
| 138 | "ROTATE": "회전", |
| 139 | "Red": "빨간색", |
| 140 | "Refresh": "새로 고침", |
| 141 | "Repeat All": "전체 반복", |

```
2019-05-09T02:06:45.515029Z [10940.134078922] user.info WebAppMgr [ ] com.webos.app.photovideo NL_RATATE
{"time":1557367603344, "label" : "ROTATE" , "type" : "keydown"}
```

```
{
    "include": {
        "label": "CONFIRM",
        "panel": "AGREEMENT TO TERMS AND CONDITIONS"
    },
    "data": {
        "messageId": "NL_PANEL_OK",
        "panel": {
            "closest": "article[role='region']",
            "value": {
                "selector": "header h1",
                "value": "<text>"
            }
        }
    }
},
```

FIG. 20B

```
{
    "include": {
        "label": "CONFIRM",
        "popup": "WITHDRAWAL OF AGREEMENT"
    },
    "data": {
        "messageId": "NL_POPUP_OK",
        "popup": {
            "closest": "[class *= 'Pupup_body']",
            "value": {
                "selector": "[calss *= 'Dialog_body']",
                "value": "<text>"
            }
        }
    }
},
```

DISPLAY DEVICE

CROSS-REFERENCE TO RELATED APPLICATIONS

This application is the National Stage filing under 35 U.S.C. 371 of International Application No. PCT/KR2019/014041, filed on Oct. 24, 2019, the contents of which are all incorporated by reference herein in their entirety.

TECHNICAL FIELD

Embodiments relate to a display device.

BACKGROUND ART

Recently, digital TV services using wired or wireless communication networks are becoming common. Digital TV services are capable of providing various services that could not be provided by the existing analog broadcasting services. A TV is a type of display device.

For example, Internet Protocol Television (IPTV) and smart TV services, which are types of digital TV services, provide interactivity so that users can actively select the types of watching programs, the watching time, and the like. The IPTV and smart TV services can provide various additional services, such as Internet search, home shopping, and online games, based on such interactivity.

Recently, various applications for enabling various additional services are installed on TVs. Additional service-related applications provided by TV manufacturers (or application providers) are usually installed and released on TVs.

When various functions related to the corresponding applications are operated, log information on the operations is obtained and used as important information of the TV manufacturers. For example, the TV users' tendencies, hobbies, preferences, or inconveniences may be obtained through log information according to various functional operations performed by each TV user in a corresponding application, and may be referred to when manufacturing TVs or applications. In addition, log information obtained by application execution of each TV user' may be utilized in various ways.

On the other hand, in order to set or change application-related functions after the release of the corresponding TVs, firmware programs provided by the TV manufacturers must be updated in the TVs. For example, when specific log items are added to or deleted from an application set before the release of the corresponding TV, the corresponding TV must be updated by a firmware program related thereto.

In general, log information can be obtained only when log items are set in the corresponding application before the release of TV. Therefore, even when there is log information that a TV manufacturer or the like wants to obtain, if a log item for obtaining the log information is not set before the release of TV, the corresponding log information cannot be obtained.

However, even after the release of TV, if the log items are set in the application installed on the TV by using a method such as firmware program update, when a function related to the corresponding log item is operated in the corresponding application, log information corresponding to the log item is obtained.

However, it takes a lot of time and cost to separately produce a firmware program. For example, in order to produce a firmware program, legal review on obtaining log information corresponding to the log item to be added in advance, and collecting various opinions on the usability or feasibility of the log item are required.

In addition, even if it is decided to add the log item through legal review and feasibility review, the firmware program must be produced by the collaboration of many program developers.

In particular, if the TV is released worldwide, firmware programs must be produced for each country or language so as to suit each country or language. Since such firmware programs must be produced and distributed for each country, considerable time and cost are required.

DISCLOSURE OF INVENTION

Technical Problem

Embodiments provide a display device in which log items can be freely set or changed even after the release of the display device.

Embodiments provide a display device in which log items can be easily set or changed regardless of various languages.

Technical Solution

According to an aspect of an embodiment, a display device includes: a display configured to display an execution screen of an application; a network interface configured to receive logging configuration information related to the application; and a controller. The controller is configured to: update the received logging configuration information in a configuration file; when an event for the execution screen of the application occurs, obtain logging item information for logging an operation of the event from the updated configuration file; and obtain log information related to the operation of the event by using the obtained logging item information.

According to another aspect of an embodiment, an operating method of a display device includes: receiving logging configuration information related to an application and updating the received logging configuration information in a configuration file; when an event for an execution screen of the application occurs, obtaining logging item information for logging an operation of the event from the updated configuration file; and obtaining log information related to the operation of the event by using the obtained logging item information.

Advantageous Effects

According to an embodiment, even after the release of the display device, there is no need to distribute separate firmware, and logging configuration information for which log information is desired to be obtained is simply downloaded, and log information related to the operation of the event of the application can be easily obtained by using the logging configuration information. Accordingly, according to an embodiment, it is possible to reduce a huge amount of time and cost required for manufacturing and distributing separate firmware in the past.

According to an embodiment, when an event for the execution screen of the application occurs, logging item information for logging the operation of the event can be obtained, and log information related to the operation of the event can be obtained by using the obtained logging item information, thereby obtaining log information easily through a simple operation.

According to an embodiment, representative character string information related to the corresponding event can be obtained by using a multilingual table, and log information related to the operation of the event can be obtained based on the obtained representative character string information. Therefore, there is an advantage in that log information can be directly obtained in the country or language, regardless of the country or language area in which the display device is released.

BRIEF DESCRIPTION OF DRAWINGS

FIG. 14 illustrates a state in which label information is obtained.

FIG. 16 illustrates a state in which unique character string information is obtained by using the multilingual table.

FIG. 17 illustrates a state in which log information is obtained by using the unique character string information.

FIG. 20A illustrates a state in which information on agreement to the terms and conditions is obtained in relation to the screen illustrated in FIG. 19A.

FIG. 20B illustrates a state in which information on withdrawal of agreement to the terms and conditions is obtained in relation to the screen illustrated in FIG. 19B.

BEST MODE FOR CARRYING OUT THE INVENTION

Hereinafter, embodiments will be described in detail with reference to the accompanying drawings. The suffixes "module" and "unit" for components used in the description below are assigned or mixed in consideration of easiness in writing the specification and do not have distinctive meanings or roles by themselves.

Figure 1:
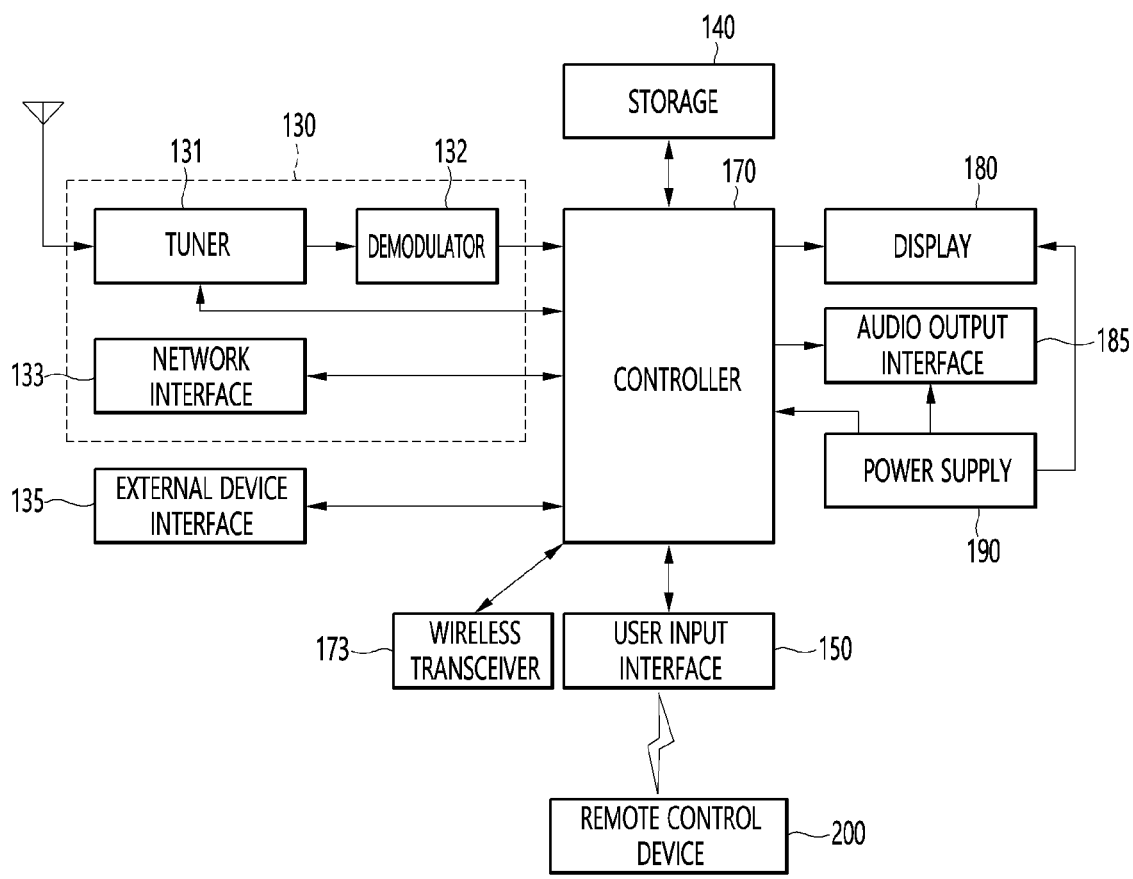
FIG. 1 is a block diagram illustrating a configuration of a display device according to an embodiment.

FIG. 1 is a block diagram illustrating a configuration of a display device according to an embodiment.

Referring to FIG. 1, a display device 100 can include a broadcast receiver 130, an external device interface 135, a storage 140, a user input interface 150, a controller 170, a wireless transceiver 173, a display 180, an audio output interface 185, and a power supply 590.

The broadcast receiver 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 130 can be one of a set-top box, a Blu-ray player, a DVD player, a game console, a sound bar, a smartphone, a PC, a USB Memory, and a home theater system but this is just exemplary.

The network interface 133 can provide an interface for connecting the display device 100 to a wired/wireless network including internet network. The network interface 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the control module 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless transceiver 173 can perform a wired or wireless communication with an external electronic device. The wireless transceiver 173 can perform short-range communication with an external device. For this, the wireless transceiver 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless transceiver 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless transceiver 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless transceiver 173. Accordingly, a user of the wearable device can use the data processed in the display device 100 through the wearable device.

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment and its specific operation or device does not limit the scope of the embodiment.

According to another embodiment, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment described below can be performed by one of the display device described with reference to FIG. 1, an image processing device such as the separated set-top box, and a content playback device including the display 180 and the audio output interface 185.

Figure 2:
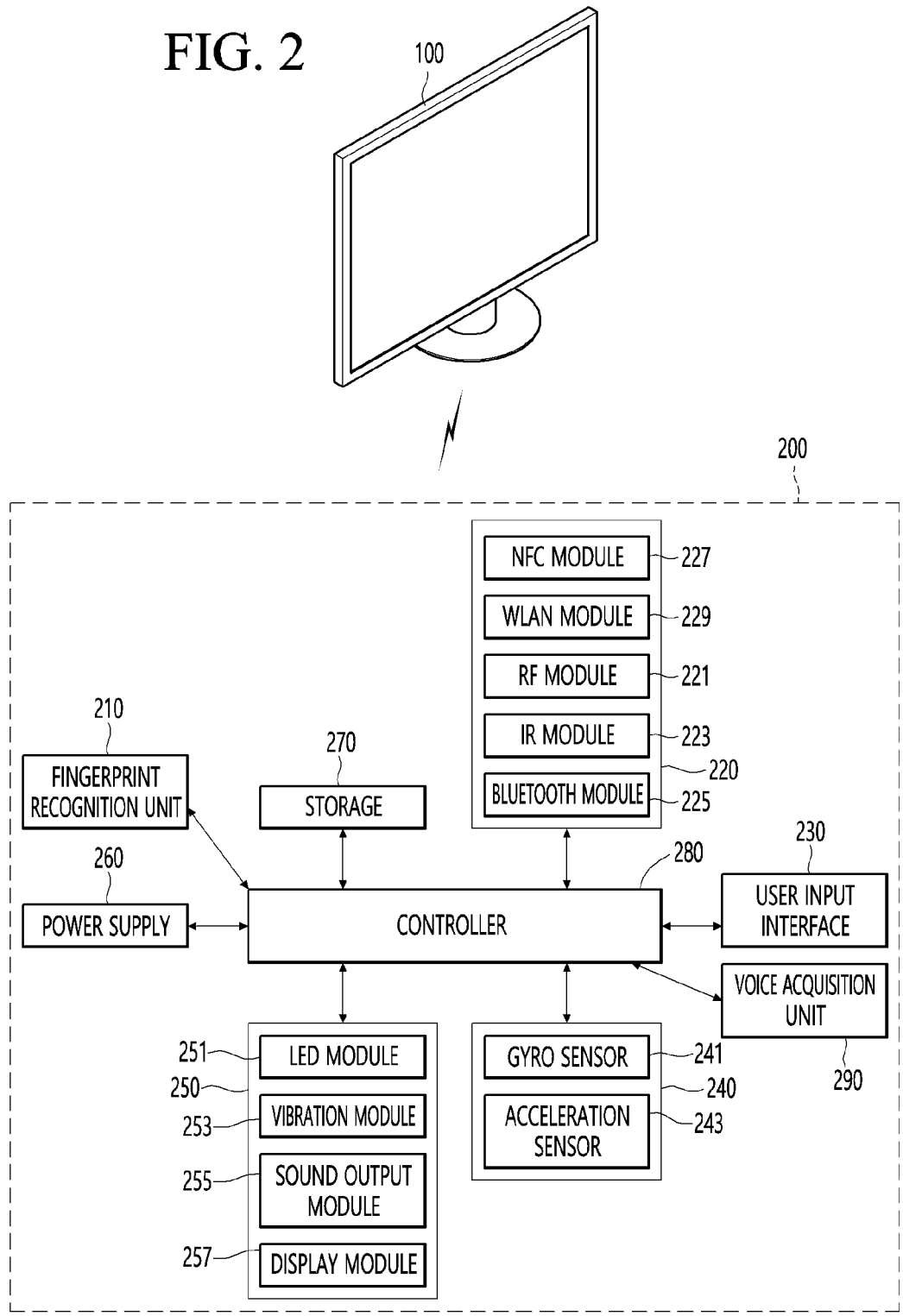
FIG. 2 is a block diagram illustrating a remote control device according to an embodiment of the present disclosure.
Figure 3:
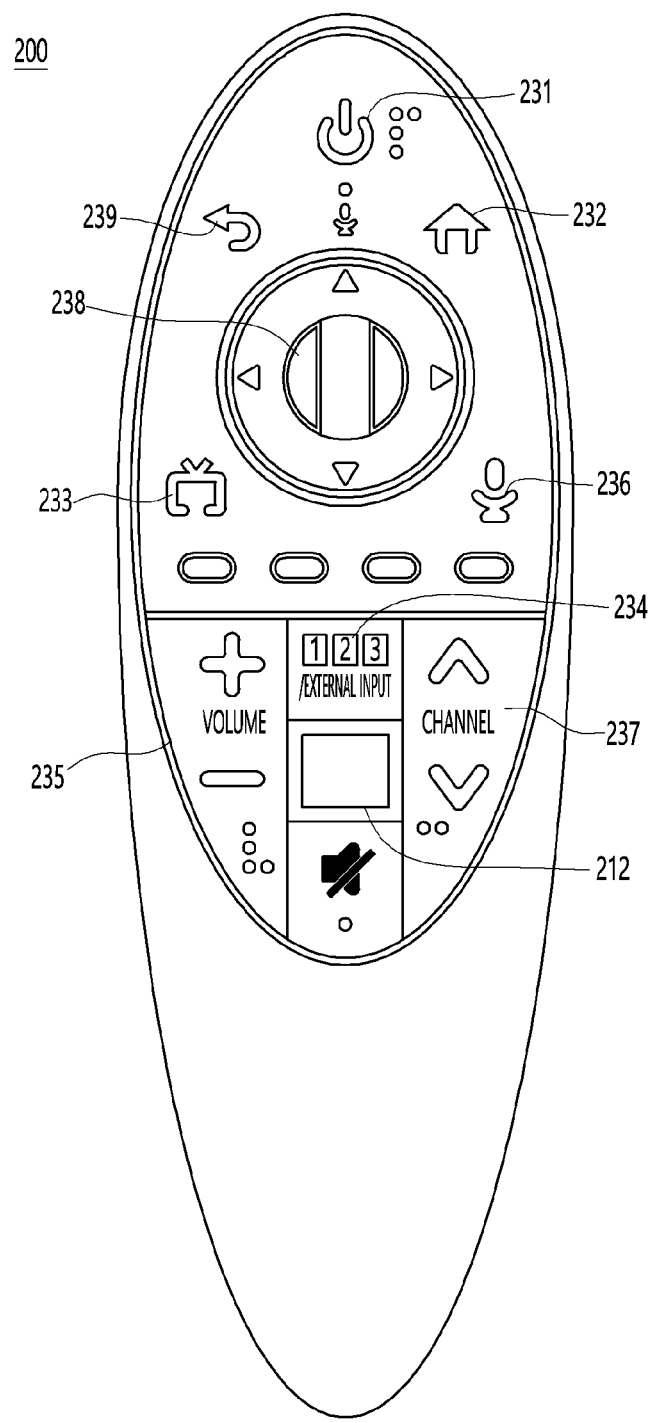
FIG. 3 is a view illustrating an actual configuration of a remote control device according to an embodiment of the present disclosure.

Then, referring to FIGS. 2 and 3, a remote control device is described according to an embodiment.

FIG. 2 is a block diagram illustrating a remote control device according to an embodiment and FIG. 3 is a view illustrating an actual configuration of a remote control device according to an embodiment.

First, referring to FIG. 2, a remote control device 200 can include a fingerprint recognizer 210, a wireless transceiver 220, a user input interface 230, a sensor 240, an output interface 250, a power supply 260, a storage 270, a controller 280, and a voice acquirer 290.

Referring to FIG. 2, the wireless transceiver 225 transmits/receives signals to/from an arbitrary any one of display devices according to the above-mentioned embodiments.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless transceiver 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the embodiment.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 235 or corresponding to signals transmitted from the display device 100. A user can recognize whether the user input interface 235 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 235 is manipulated or signals are transmitted/received to/from the display device 100 through the wireless transceiver 225.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 235 or a signal corresponding to a movement of the remote control device 200 sensed by the sensor 240 to the display device 100 through the wireless transceiver 225.

Additionally, the voice acquirer 290 of the remote control device 200 can obtain voice.

The voice acquirer 290 can include at least one microphone 291 and obtain voice through the microphone 291.

Figure 4:
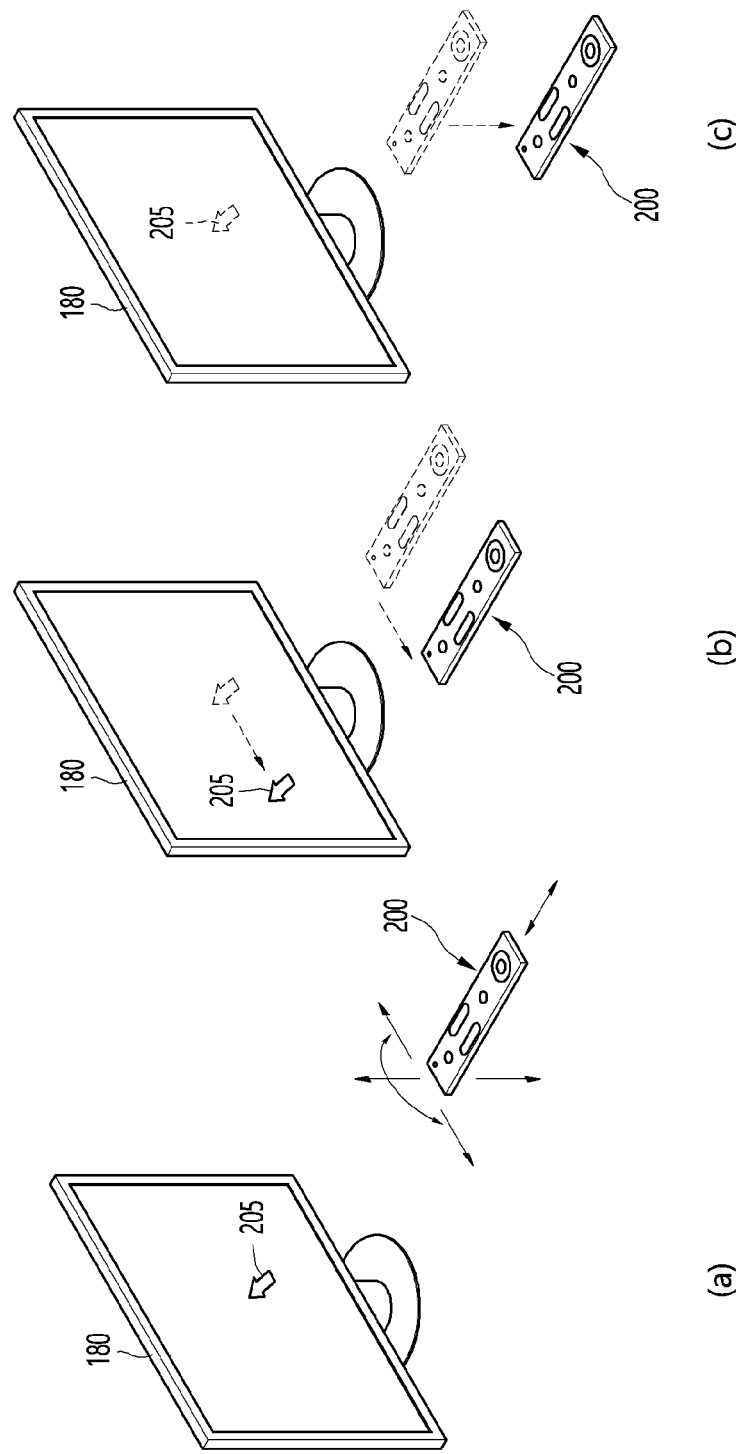
FIG. 4 is a view of utilizing a remote control device according to an embodiment.

Then, FIG. 4 is described.

FIG. 4 is a view of utilizing a remote control device according to an embodiment.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

The terms described below can be defined as follows.

Logging can be a process of creating a record about a specific operation of an application. A log can be the created record itself.

Logging item information can include representative character string information and unique character string information.

For example, the representative character string information can be text of a common language. The representative character string information can be text written in the most widely used language in the world. For example, the representative character string information can be text written in English.

For example, the unique character string information can be information that is recognizable by an application. For example, the unique character string information can be information that is recognizable by a display device. For example, the unique character string information can be information that is recognizable by an external device, for example, a server, which provides logging item information. Accordingly, the application, the display device, or the server can recognize which operation the log information relates to through the unique character string information.

For example, the server can be a server that is operated by the manufacturer of the display device. For example, the server can be a server that is entrusted by the manufacturer of the display device. For example, the server can be a server independent of the manufacturer of the display device. The server may provide logging configuration information to the display device in order to obtain log information on the application installed on the display device. Log information on a specific event operation of the application installed on the display device can or cannot be obtained by providing logging configuration information.

Multilingual tables can be provided for each country or language. Each of the multilingual tables can include a plurality of pieces of label information and representative character string information corresponding to each of the plurality of pieces of label information. The label information is text information displayed on the display device by execution of the corresponding application, and can be text information corresponding to a command or control for specifically performing an operation. For example, in the case of a command for performing a rotation operation, 'rotation' can be label information.

According to an embodiment, since the multilingual table is provided for each country or language, representative character string information corresponding to the label information related to the corresponding country or language can be easily obtained by using the multilingual table suitable for the corresponding country, regardless of the country in which the display device is released.

According to an embodiment, logging configuration information related to the application executable on the display device can be received, and the received logging configuration information can be updated in the configuration file. When an event occurs on the execution screen of the application, log information related to the operation of the event can be obtained by using the logging item information obtained from the updated configuration file.

According to an embodiment, due to this series of operations, the logging item information for which log information is to be obtained even after the release of the display device is updated in the corresponding configuration file at any time by using the logging configuration information provided from the outside. Therefore, it is possible to easily obtain desired log information based on the logging configuration information updated in the corresponding configuration file.

In addition, the deletion of the logging item information included in the existing configuration file can also be easily solved by using the logging configuration information, so that the log information related to the corresponding logging item information is not obtained.

Accordingly, according to an embodiment, the log information can or cannot be obtained at any time after the product release of the display device. In addition, applications installed on the display device can be easily controlled from the outside without cost and time.

Figure 5:
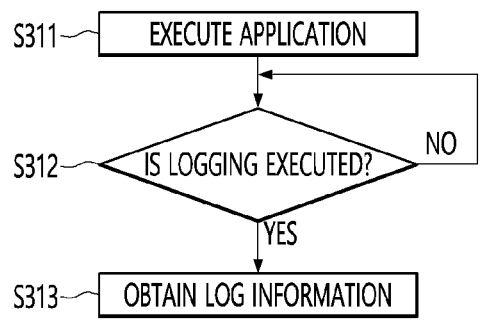
FIG. 5 is a flowchart for describing an operating method of a display device according to an embodiment.

FIG. 5 is a flowchart for describing an operating method of the display device according to an embodiment.

Referring to FIG. 5, the controller 170 can execute an application (S311).

At least one application can be installed on the display device 100 and released as a product. Alternatively, the display device 100 can download and install one or more applications through the network interface 133 after the release of the product. The controller 170 can execute each of the one or more applications installed on the display device 100.

For example, the controller 170 can control the display 180 to display an application item corresponding to each of the one or more applications.

Figure 12:
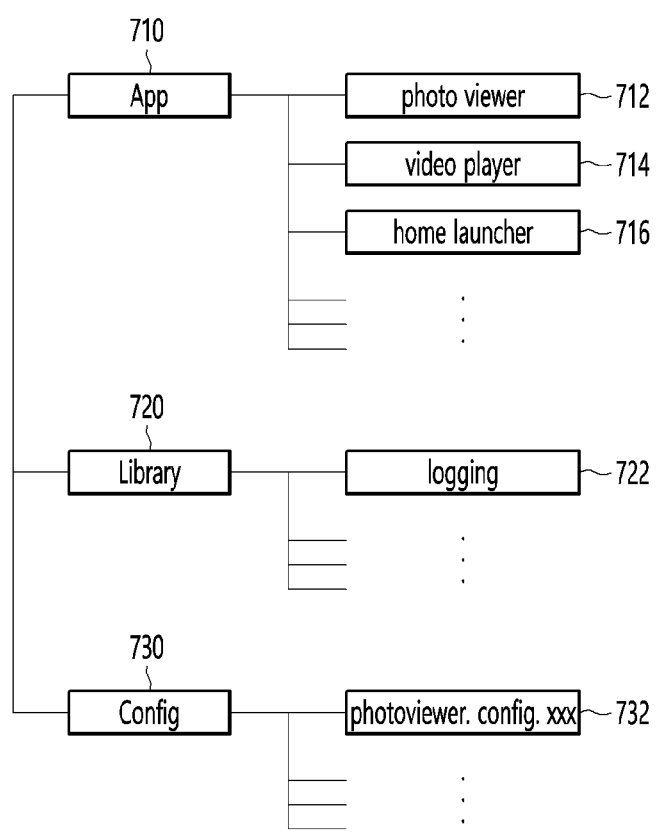
FIG. 12 illustrates a tree structure related to an application in the display device according to an embodiment.

One application item among one or more application items can be a photo viewer application, that is, an item for executing a photo viewer execution file 712 included in an application folder 710 illustrated in FIG. 12. When the controller 170 receives a command for selecting a corresponding photo viewer application item from a user, the controller 170 can execute the photo viewer application.

Figure 7:
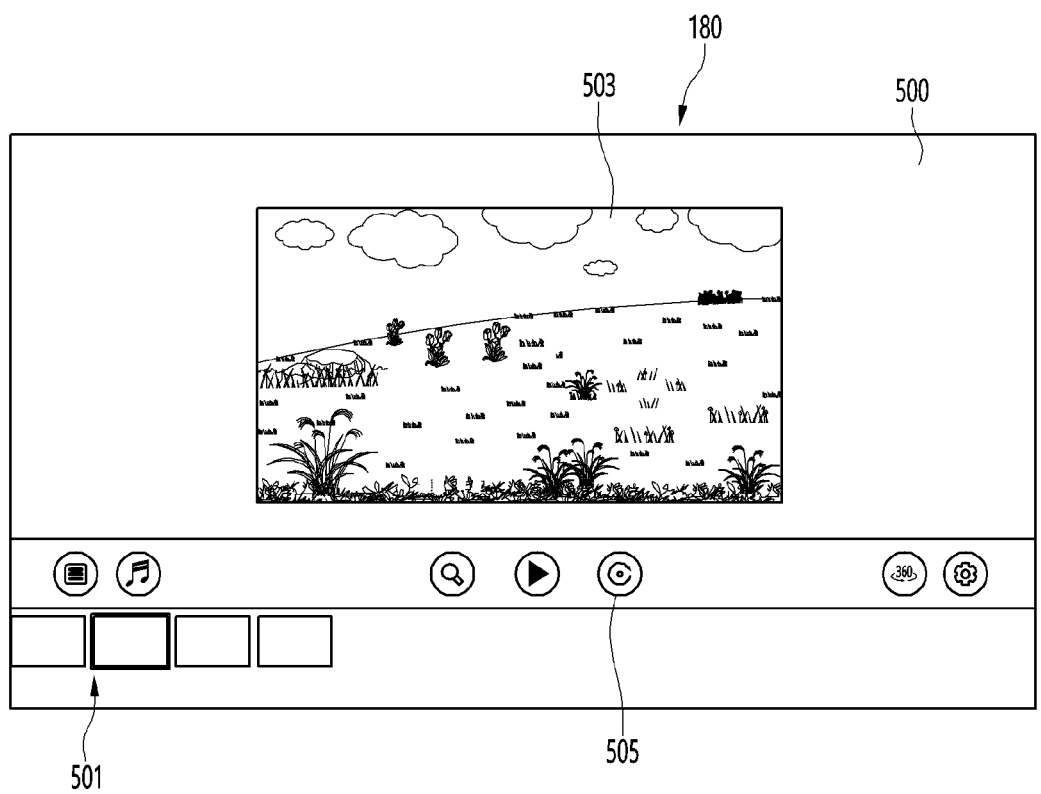
FIG. 7 illustrates an execution screen of an application displayed on the display device according to an embodiment.

As illustrated in FIG. 7, the controller 170 can control the display 180 to display a thumbnail list 501 as a result of executing the photo viewer application. The thumbnail list 501 may include a plurality of thumbnail photos or video images. For example, the thumbnail list 501 can be located on the lower side of the screen of the display 180, but the present disclosure is not limited thereto.

On the other hand, a photo image 503 can be displayed on the central area of the screen 500 of the display 180, but the present disclosure is not limited thereto. The photo image 503 can be an image related to one thumbnail photo or video among a plurality of thumbnail photos or videos included in the thumbnail list 501. For example, the photo image 503 can be an image related to a thumbnail photo or video corresponding to a point at which the pointer 205 illustrated in FIG. 4 is located among the plurality of thumbnail photos or videos included in the thumbnail list 501.

A plurality of control-related items can be displayed on the screen 500 of the display 180. The plurality of control-related items can be, for example, an item for controlling the photo image 503. For example, the plurality of control related items can include a rotate button item 505. The rotation button item 505 can be an item for controlling the rotation of the photo image 503. For example, when the controller 170 receives a command for selecting the rotation button item 505, the controller 170 can rotate the photo image 503 according to a preset condition. The preset condition can include a rotation direction, a rotation angle, a number of rotations, a rotation speed, and the like.

The controller 170 can execute logging (S312).

As described above, logging can be a process of creating a record about a specific operation of an application.

The controller 170 can obtain whether it is set to perform logging for the corresponding application, and can execute logging if it is set to perform logging. When it is not set to perform logging, the controller 170 performs setting to perform logging, or does not execute logging.

When an event related to the corresponding application occurs, the controller 170 can obtain logging item information on the operation of the corresponding event and can execute logging to create a record about the operation of the corresponding event by using the obtained logging item information.

If logging item information on the operation of the corresponding event is not obtained, the controller 170 may not execute logging. Alternatively, when the controller 170 fails to obtain logging item information on the operation of the corresponding event, the controller 170 can display guide information related to logging execution failure on the display 180. Alternatively, when the controller 170 fails to obtain the logging item information on the operation of the corresponding event, the guide information related to logging execution failure can be transmitted to the outside, for example, the server. The guide information related to logging execution failure can be transmitted to the server through, for example, the network interface 133 or the wireless communication module. The guide information related to logging execution failure, which is transmitted to the server, can include request information for requesting the corresponding logging item information.

The controller 170 can obtain log information (S313).

The controller 170 can obtain log information related to the operation of the event. The controller 170 can obtain log information on a specific operation of the application by executing logging. The log information can include, for example, record information on the operation of the event.

Hereinafter, operation S312 of executing the logging will be described in more detail with reference to FIG. 6.

Figure 6:
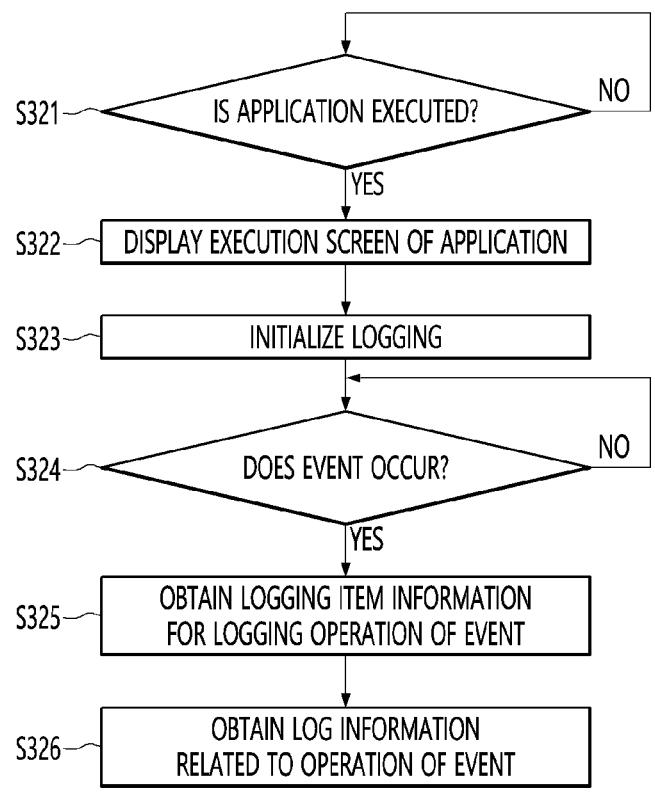
FIG. 6 is a flowchart for describing, in more detail, the operating method of the display device illustrated in FIG. 5.

FIGS. 1 and 6 are flowcharts for describing, in more detail, the operating method of the display device illustrated in FIG. 5.

Referring to FIG. 6, the controller 170 can execute an application (S321).

Since S321 is the same as S311 illustrated in FIG. 5, a detailed description thereof is omitted.

The controller 170 can display an execution screen of the application (S322).

As described above, the controller 170 can display one or more application items on the screen of the display 180. The phrase "the one or more application items are displayed on the screen of the display 180" can mean that an application that can be executed by the corresponding application item is installed on the display device 100. Accordingly, when the controller 170 receives a command for selecting one of the one or more application items displayed on the screen of the display 180, the controller 170 can control the display 180 to execute the application corresponding to the selected application item and display the execution screen of the corresponding application.

If the selected application item is a photo viewer application item, when the controller 170 receives a command for selecting the corresponding photo viewer application item, the controller 170 can control the display 180 to display the execution screen 500 of the photo viewer application as illustrated in FIG. 7. The execution screen 500 of the photo viewer application can include, for example, a thumbnail list 501, a photo image 503, and a plurality of control-related items including a rotation button item 505. For example, the thumbnail list 501 can be displayed at the lower side of the execution screen 500 of the photo viewer application, the photo image 503 can be displayed in the central area of the execution screen 500 of the photo viewer application, and the control-related items can be displayed at the lower side of the execution screen 500 of the photo viewer application and can be displayed above the thumbnail list 501, but the present disclosure is not limited thereto. A user may view a desired photo or video through the execution screen 500 of the photo viewer application, and various controls or functions for the photo can be implemented by selecting the plurality of control-related items.

The controller 170 can initialize logging (S323).

The initialization of logging can mean setting or configuring an initial environment to execute logging related to the corresponding application when the corresponding application is executed. As will be describe below, library files and configuration files related to the corresponding application can be loaded through the initialization of logging.

In this way, when an event occurs after the loading is initialized, logging related to the operation of the corresponding event can be executed based on the initialized loading environment-related information.

The controller 170 can obtain whether an event occurs (S324).

The controller 170 can obtain whether an event occurs, according to whether a command for selecting the control-related item is received. When the controller 170 receives the command for selecting the control-related item, the controller 170 can obtain that the event related to the execution of the operation corresponding to the selected control-related item occurs.

When the event occurs, the controller 170 can obtain logging item information for logging the operation of the event (S325).

When the event occurs, logging item information for logging the operation of the event can be obtained based on a library file, a configuration file, etc. loaded through the initialization of logging.

As illustrated in FIG. 12, the display device 100 can include various file folders having a tree structure related to applications. When a specific application is installed on the display device 100, various files related to the specific application can be stored in an application folder 710, a library folder 720, and a configuration folder 730.

For example, the application folder 710 can include various execution files, such as a photo viewer execution file 712, a video player execution file 714, and a home launcher 716. The photo viewer execution file 712, the video player execution file 714, and the home launcher 716 can each be an executable application program. For example, the library folder 720 can include various library files, such as a logging library file 722. For example, the logging library file 722 can include various types of information for logging an operation of an event related to the photo viewer. For example, the configuration folder 730 can include various configuration files, such as a photo viewer configuration file 732. The configuration file can be a logging configuration file related to logging of an operation of an event occurring in the corresponding application.

The photo viewer configuration file 732 can include information related to whether logging of an event related to the photo viewer is possible, for example, logging item information.

For example, as illustrated in FIG. 7, when the photo viewer application is executed and the controller 170 receives a command for selecting the rotation button item 505, the controller 170 can obtain logging item information related to a rotation event corresponding to the rotation button item 505 from the photo viewer configuration file 732 of the configuration folder 730, and can obtain log information related to the operation of the rotation event by using the obtained logging item information.

For example, when the controller 170 fails to obtain the logging item information related to the rotation event corresponding to the rotation button item 505 from the photo viewer configuration file 732 of the configuration folder 730, the controller 170 may not obtain log information related to the operation of the rotation event. In this case, if the controller 170 receives the corresponding logging item information from the server and updates the photo viewer configuration file 732, when the controller 170 receives a command for selecting the rotation button item 505 again, the controller 170 can obtain logging item information related to the rotation event corresponding to the rotation button item 505 from the updated photo viewer configuration file 732. Accordingly, the controller 170 can obtain log information related to the operation of the rotation event by using the obtained logging item information.

The controller 170 can obtain log information related to the operation of the event by using the obtained logging item information (S326).

Since S326 is the same as S313 illustrated in FIG. 5, a detailed description thereof is omitted.

Although not illustrated, the controller 170 can store the obtained log information in the storage 140 or can transmit the obtained log information to the server through the network interface 133. The server can collect the log information received through the network interface 133 and utilize the collected log information to upgrade the corresponding application.

On the other hand, in an embodiment, the configuration file related to the corresponding application can be frequently updated in the display device 100. For example, logging configuration information received from the server can be updated in the configuration file. The logging configuration information can include, for example, additional information of the logging item or deletion information of the logging item. Through the updating of the configuration file, new logging item information can be added to the corresponding configuration file, or existing logging item information included in the configuration file can be deleted or omitted. On the other hand, the logging configuration information may include application information. The controller 170 can update the logging configuration information to a configuration file related to the corresponding application among a plurality of configuration files of the configuration folder (730 of FIG. 12), based on the application information.

For example, log information on the operation of the specific event is not previously obtained, but logging item information for logging the operation of the specific event is newly added. Therefore, log information on the operation of the event related to the corresponding logging item information can be obtained. For example, log information on the operation of the specific event is obtained, but logging item information for logging the operation of the specific event is deleted. Therefore, log information on the operation of the event related to the corresponding logging item information cannot be obtained.

Hereinafter, a method of updating logging configuration information will be described with reference to FIG. 8.

Figure 8:
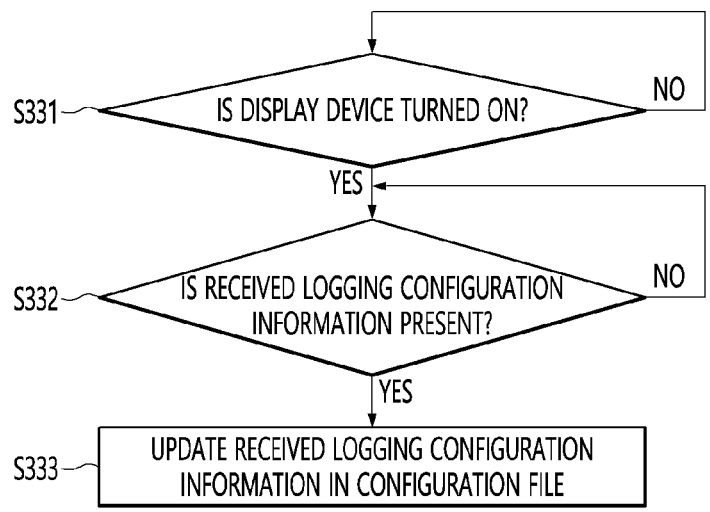
FIG. 8 is a flowchart for describing a method of updating logging configuration information.

FIG. 8 is a flowchart for describing a method of updating logging configuration information.

Referring to FIGS. 1 and 8, the controller 170 can turn on the display device 100 (S331).

The phrase "the display device 100 is turned on" can mean that power is turned on. When the controller 170 receives a command for selecting power-on of the display device 100, the controller 170 can receive power and supply the power to each component of the display device 100.

The controller 170 can obtain whether the received logging configuration information is present (S332).

When the power of the display device 100 is turned on, the controller 170 can obtain whether newly received logging configuration information is present in a predetermined area, for example, the storage 140.

For example, the logging configuration information can be received from the outside. Specifically, the logging configuration information can be received from the server. For example, the logging configuration information can be received from the server through the network interface 133.

For example, the received logging configuration information can be stored in the storage 140. For example, the received logging configuration information can be stored in a temporary buffer.

For example, the reception time of the logging configuration information is not limited. That is, since the logging configuration information is provided by the server, the time when the server arbitrarily provides the logging configuration information can be the reception time of the logging configuration information. For example, when the server wants to obtain log information for a specific event of an application installed on the display device 100, the server can transmit the log configuration information for obtaining the corresponding log information to the display device 100. The display device 100 can receive the log configuration information from the server at any time by activating the interface and the storage 140 (or the temporary buffer) regardless of network power on/off.

The controller 170 may update the received logging configuration information in the configuration file (S333).

When the received logging configuration information is present in the storage 140, the controller 170 can update the received logging configuration information in the configuration file.

The logging configuration information can include additional information of the logging item or deletion information of the logging item.

The log configuration item can be added to the configuration file by using the logging configuration information.

For example, the logging configuration information can include the additional information of the logging item, and the additional information of the logging item can include logging item information including representative character string information and unique character string information.

Figure 9:
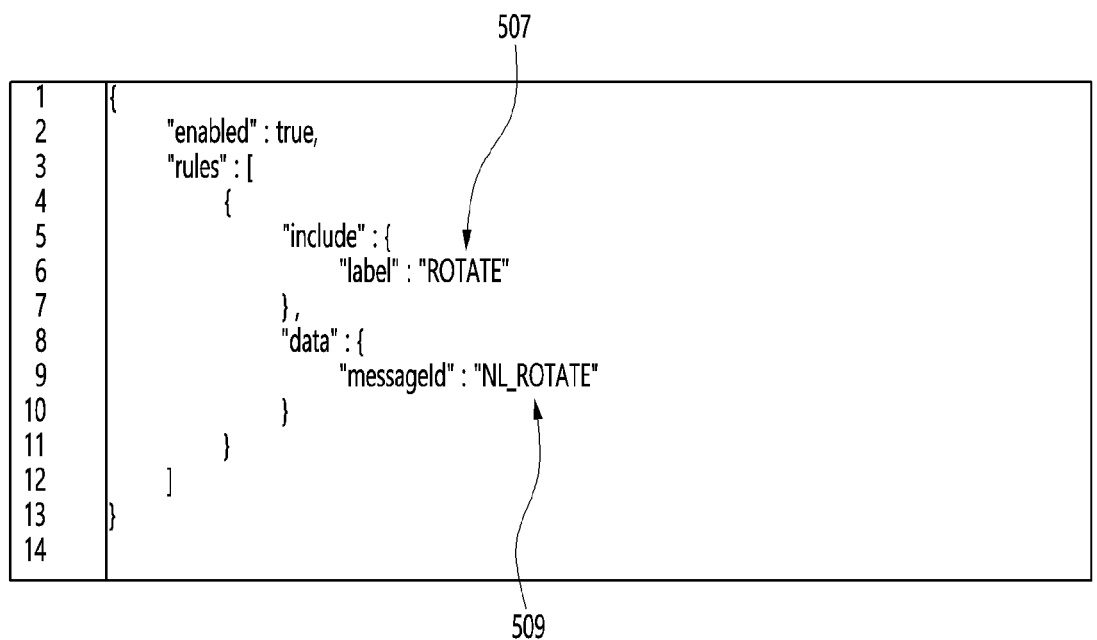
FIG. 9 illustrates a state in which logging configuration information is updated in a configuration file.

As illustrated in FIG. 9, "ROTATE" as the representative character string information 507 and "NL_ROTATE" as the unique character string information 509 can be added to the configuration file as the logging item information. In this case, " " is a relation corresponding to "ROTATE", and when " " is obtained, "NL_ROTATE" corresponding thereto can be obtained. As described above, " " can be text written in the most widely used common language in the world, and " " can be information that can be recognized by an application installed on the display device 100.

For example, as illustrated in FIG. 7, when the photo viewer application is executed and then the controller 170 receives a command for selecting the rotation button item 505, the controller 170 can obtain "ROTATE" corresponding to the rotation button item 505 in the configuration file as the representative character string information 507, and can obtain "NL_ROTATE" corresponding to "ROTATE" as the unique character string information 509. For example, it can be said that the representative character string information 507, that is, "ROTATE", is converted into the unique character string information 509, that is, "NL_ROTATE".

According to an embodiment, log information related to the operation of the specific event of the application can be easily obtained by updating the logging configuration information related to the logging of the operation of the event of the application in the configuration file. Accordingly, in an embodiment, there is no need to produce and distribute a firmware program as in the prior art, and thus enormous time and cost can be saved.

According to an embodiment, desired log information can be secured within a short time by receiving and updating logging configuration information related to the logging of the operation of the event of the application regardless of time, thereby utilizing log information more efficiently and actively.

Although not illustrated, as another method of updating logging configuration information, there is the following method.

When the display device 100 is turned on, the controller 170 can request access to the server and request new logging configuration information to the server when the server access is approved. When the server has new logging configuration information in response to the request, the server can provide new logging configuration information to the display device 100.

The controller 170 can receive new logging configuration information and update the received logging configuration information in the configuration file. Receiving new logging configuration information can be expressed as downloading new logging information.

Hereinafter, a method of obtaining log information will be described in detail with reference to FIGS. 10 to 17.

Figure 10:
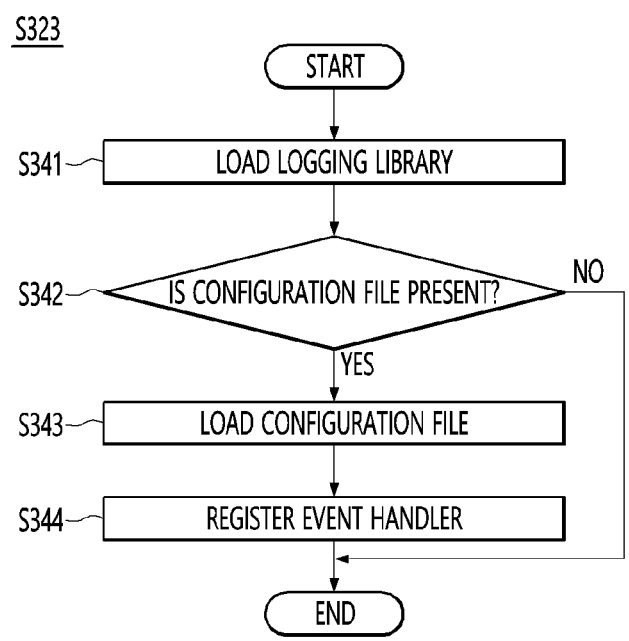
FIG. 10 is a flowchart for describing S323 illustrated in FIG. 6 in more detail.

FIG. 10 is a flowchart for describing S323 illustrated in FIG. 6 in more detail.

Referring to FIGS. 1, 6, and 10, the controller 170 can load a loading library (S341).

When an application is executed, the loading library can be loaded. As illustrated in FIG. 12, the loading library can be included in various file folders related to applications stored in the display device 100. When an application is executed, the controller 170 can load a library file related to the executed application among a plurality of library files included in a library folder 720 illustrated in FIG. 12. For example, the plurality of library files included in the library file can be a logging library file 722 used in each of a plurality of applications installed on the display device 100. For example, when a specific application is installed on the display device 100, an application file can be stored in the application folder 710, the library file can be stored in the library folder 720, and the configuration file can be stored in the configuration folder 730. The configuration file can be a logging configuration file related to the logging of the application.

The controller 170 can obtain whether the configuration file is present (S342).

The controller 170 can obtain whether the configuration file related to the logging of the executed application is present in the configuration folder 730 among folders 710, 720, and 730 having a tree structure illustrated in FIG. 12.

Even if the application is installed on the display device 100, the logging configuration file is not necessarily installed as well. That is, when the log information related to the operation of the corresponding application is not required, the corresponding configuration file may not be installed on the display device 100.

The controller 170 can load the configuration file (S343).

When the logging configuration file related to the logging of the executed application is present in the configuration folder 730 among the folders 710, 720, and 730 having the tree structure illustrated in FIG. 12, the controller 170 can load the configuration file related to the logging of the executed application from the corresponding configuration folder 730.

When the logging configuration file related to the logging of the executed application is not present in the configuration folder 730, the controller 170 may not load the configuration file. Since the configuration file is not loaded, log information may not be obtained from the operation of the corresponding application. For example, when one or more pieces of log configuration information for which log information is to be obtained is received from the server and the configuration file is created based on the log configuration information and stored in the configuration folder 730, log information related to the operation performed after the execution of the corresponding application can be obtained.

The controller 170 can register an event handler (S344).

When an event for an application occurs, the event handler can capture a screen when the corresponding event occurs, for example, the execution screen 500 illustrated in FIG. 7. By registering (or activating) the event handler having such a function, the controller 170 can obtain information on the screen 500 when the corresponding event occurs. As will be described below, label information of the control-related item selected for generating an event can be obtained from information on the screen 500.

Figure 11:
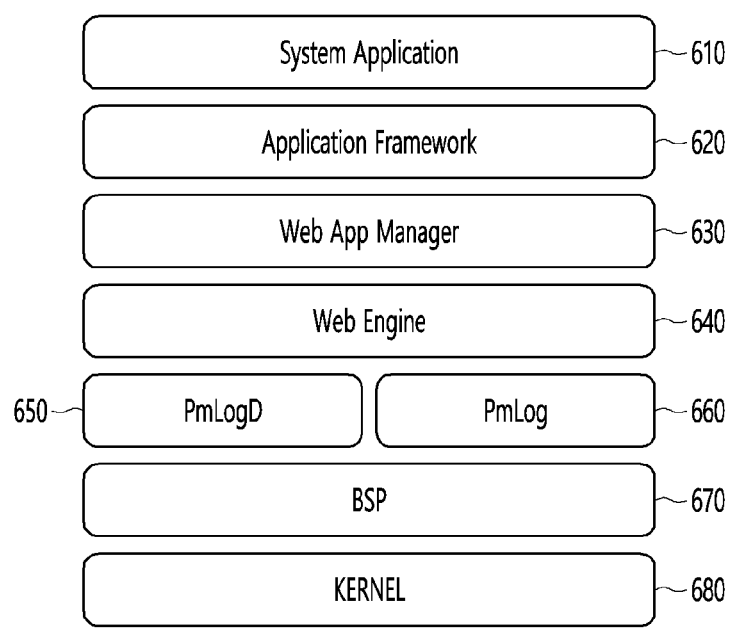
FIG. 11 illustrates an OS architecture for executing an application on the display device according to an embodiment.

On the other hand, the method of obtaining log information in the display device 100 according to an embodiment can operate based on the OS architecture illustrated in FIG. 11.

FIG. 11 illustrates an OS architecture for executing an application on the display device 100 according to an embodiment.

Referring to FIG. 11, the OS architecture can include a kernel 680 as a lowermost layer. BSP 670, Pm Log D 650, Pm Log 660, a web engine 640, an application manager (Web App manager) 630, and an application framework 620 can be sequentially positioned on the kernel 680. A system application 610 can be positioned as an uppermost layer. The Pm Log D 650 and the Pm Log 660 are layers for performing log-related operations, and both the Pm Log D 650 and the Pm Log 660 can be positioned on the same layer.

For example, the kernel 680 is a layer for providing a contact point with hardware, and can manage system resources and processors.

For example, the BSP 670 can provide a color function required for an embedded system based on a Linux kernel such as a display, media, or USB.

For example, when power of the display device 100 is turned on, the Pm Log D 650 can access the server, check whether there is new logging configuration information, receive new logging configuration information, and update the corresponding configuration file.

For example, the Pm Log 660 can perform logging for an operation of a corresponding event, obtain log information therefrom, and store the obtained log information in the storage 140 or transmit the obtained log information to the server.

For example, the web engine 640 can parse an HTML document and perform a function of executing JavaScript.

For example, the application manager 630 is a wrapper of the web engine 640, and can provide various control and system interworking functions necessary for executing an application.

For example, the application framework 620 can provide the functions used in the application in the form of components and libraries. The library file described above can be used in the application framework 620. Accordingly, the application framework 620 can manage the overall operations of obtaining log information in the display device 100 according to an embodiment.

For example, the system application 610 can be an application used at a user level.

On the other hand, a method of obtaining logging item information from a configuration file will be described with reference to FIG. 13.

Figure 13:
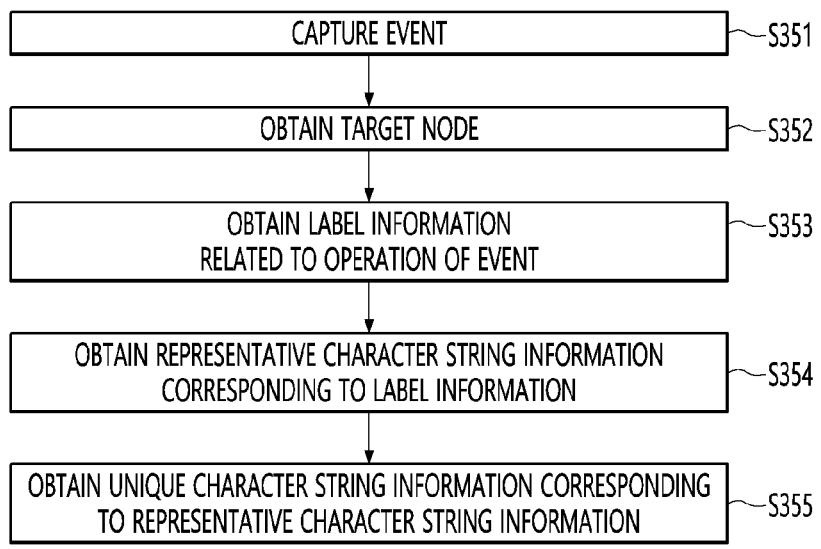
FIG. 13 is a flowchart for describing S325 illustrated in FIG. 6 in more detail.

FIG. 13 is a flowchart for describing S325 illustrated in FIG. 6 in more detail.

Referring to FIGS. 1, 6, and 13, the controller 170 can capture an event (S351).

The controller 170 can capture the event by using the event handler. Specifically, when the event occurs, the controller 170 can capture a screen when the event occurs. For example, as illustrated in FIG. 7, the controller 170 can receive a command for selecting the rotation button item 505, and can recognize the occurrence of a rotation event related to the rotation button item 505 by such reception. When the controller 170 recognizes the occurrence of the rotation event, the controller 170 can capture the execution screen 500 including the rotation button item 505.

The controller 170 can obtain a target node (S352).

The controller 170 can obtain the target node based on the captured execution screen 500.

For example, when the execution screen 500 is captured, the controller 170 can obtain a data structure corresponding to the execution screen 500. The controller 170 can obtain the target node including label information by analyzing the data structure.

The target node can be a node including label information corresponding to the rotation event on the execution screen 500. For example, the target node can be a node corresponding to the rotation button item 505 included in the execution screen 500.

The controller 170 can obtain label information on the operation of the event (S353).

The controller 170 can obtain the label information from the obtained target node.

For example, the label information can be included in the target node. For example, the target node and the label information can be configured separately. In this case, the label information can be positioned adjacent to the target node.

Accordingly, when the target node is obtained by analyzing the data structure, the controller 170 may obtain label information positioned in the target node or separately from the target node. The label information can be text information displayed on the display device 100 by the execution of the corresponding application.

For example, the label information can be 'rotate' in the rotation button item 505 included in the execution screen 500 illustrated in FIG. 7. For example, the label information 'rotation' can be included in the target node. When the execution screen 500 is captured, the controller 170 can obtain the data structure corresponding to the execution screen 500 as illustrated in FIG. 14. The data structure can be a program constituting the execution screen 500.

The controller 170 can obtain the target node by analyzing the data structure. For example, the target node can be 'aria-label' in the data structure. The target node can be a node including label information corresponding to the rotation event on the execution screen 500. For example, the target node can be a node corresponding to the rotation button item 505 included in the execution screen 500. When the target node is obtained, the controller 170 can obtain label information 511 positioned adjacent to the target node.

As illustrated in FIG. 14, when the controller 170 obtains the target node 'arial-label' from 'arial-label=rotate' included in the data structure, the label information 511 adjacent to the target node, that is, 'rotate' can be easily obtained.

The controller 170 can obtain representative character string information corresponding to the label information (S354).

For example, when the label information is obtained, the controller 170 can obtain representative character string information corresponding to the obtained label information by using a plurality of multilingual tables.

Figure 15:
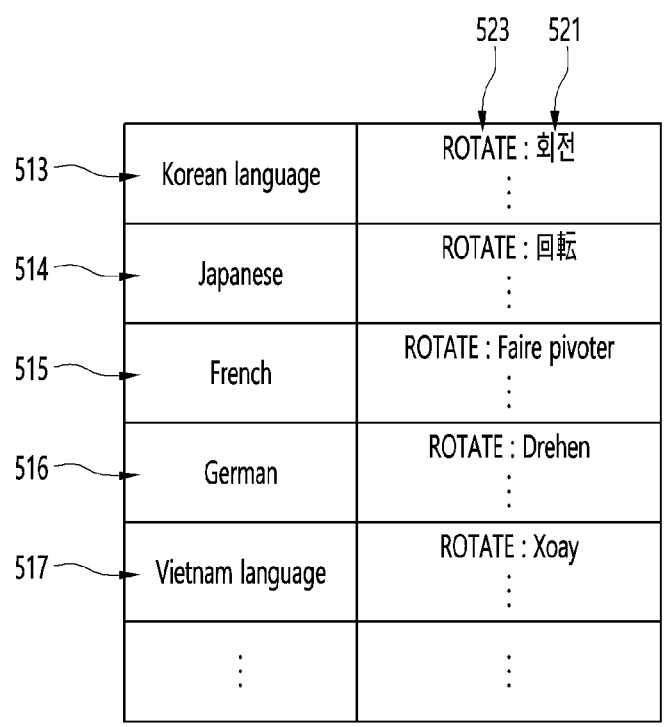
FIG. 15 illustrates a multilingual table.

A plurality of multilingual tables 513 to 517 as illustrated in FIG. 15 can be stored in the storage 140. For example, the multilingual tables 513 to 517 can be provided for each country or language. Each of the multilingual tables 513 to 517 can include a plurality of pieces of label information 521 and representative character string information 523 corresponding to each of the label information.

For example, the Korean table 513 can include the label information 521 of '회전' in Korean text, and the Japanese table 514 can include the label information 521 of '回''' in Japanese text. For example, the French table 515 can include the label information 521 of 'Faire pivoter' in French text, and the German table 516 can include the label information 521 of 'Drehen' in German text. For example, the Vietnamese table 517 can include the label information 521 of 'Xoay' in Vietnamese text. As such, the multilingual tables 513 to 517 can include different label information for each country or language with respect to the label information 521 having the same meaning. In contrast, all the multilingual tables 513 to 517 can include the same representative character string information 523, that is, 'ROTATE'.

Accordingly, the controller 170 can load the multilingual tables 513 to 517, select one multilingual table from the multilingual tables 513 to 517, and obtain the representative character string information 523 corresponding to the obtained label information from the selected multilingual table.

For example, one multilingual table can be selected from among the multilingual tables 513 to 517 by using language information set in the display device 100. The display device 100 can display information, data, or text on the display based on language information set by default. The language information set by default can be changed. For example, when the display device 100 is set in Korean, it can be changed to English. In this case, information, data, or text can be displayed on the screen of the display device 100 in English.

The controller 170 can obtain language information set in the display device 100. Accordingly, the controller 170 can obtain one multilingual table from among the plurality of multilingual tables 513 to 517 based on the obtained language information. In this case, when the display device 100 is released to China, it can be set in Chinese and information and the like can be displayed. When the display device 100 is released in Germany, it can be set in German and information and the like can be displayed. As such, when the display device 100 is released for each country or language area, it can be set as the corresponding language information for each released country or language area.

As illustrated in FIG. 16, the controller 170 can obtain representative character string information 533 corresponding to the obtained label information 531 based on the Korean table 513. If '회전' is obtained as the label information (S353 in FIG. 13), the controller 170 can search the Korean table 513 to find the same label information (531 in FIG. 16) as the obtained label information, and if the corresponding label information 531 is found, the controller 170 can obtain representative character string information 533 corresponding to the label information 531. Accordingly, when the label information 531 of '회전' is found in the Korean table 513, 'ROTATE' corresponding to '회전' can be obtained as the representative character string information 533.

The controller 170 can obtain unique character string information corresponding to the representative character string information (S355).

For example, the controller 170 can obtain unique character string information corresponding to the representative character string information from the configuration file, and can obtain log information related to the operation of the event by using the obtained unique character string information.

The representative character string information and the unique character string information can be included in logging item information included in the configuration file. In other words, the logging item information can include the representative character string information and the unique character string information.

As illustrated in FIG. 17, the controller 170 can obtain the unique character string information 535 corresponding to the obtained representative character string information based on the configuration file. As illustrated in FIG. 16, if '회전' is obtained as representative character string information 533 in the Korean table, the controller 170 can search the configuration file to find the same representative character string information as the obtained representative character string information, and if the corresponding representative character string information is found, the controller 170 can obtain unique character string information 535 corresponding to the representative character string information. Accordingly, if the representative character string information of 'ROTATE' is found in the configuration file, 'NL_ROTATE' corresponding to 'ROTATE' can be obtained as the unique character string information 535.

According to an embodiment, if the plurality of multilingual tables 513 to 517 made for each country or language are installed on the display device 100, representative character string information (523 of FIG. 15), which is a common text, can be obtained regardless of the country or language area in which the display device 100 is released. Accordingly, in an embodiment, since log information is obtained based on the representative character string information 523, the same log information can be obtained for the same event regardless of country or language, thereby facilitating global management of log information. In addition, according to an embodiment, there is an advantage of reducing the time and cost required for developing, producing, and distributing a separate firmware program for each country or language.

Figure 19A:
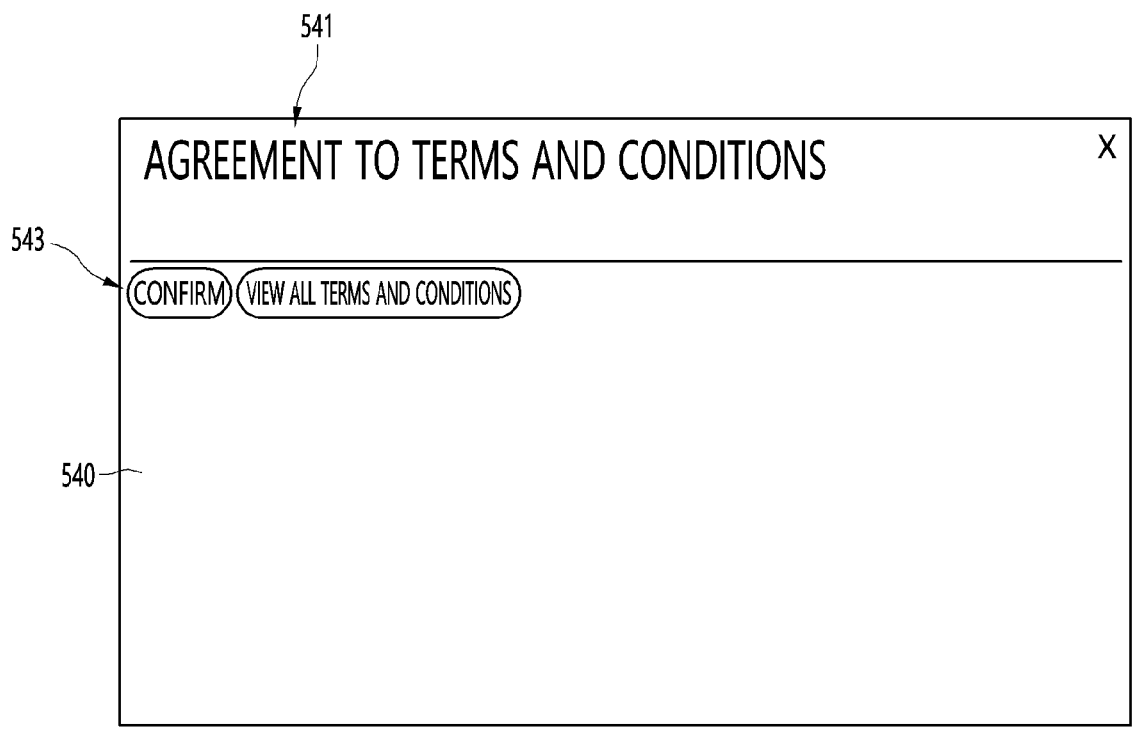
FIG. 19A illustrates a screen displaying agreement to the terms and conditions.
Figure 19B:
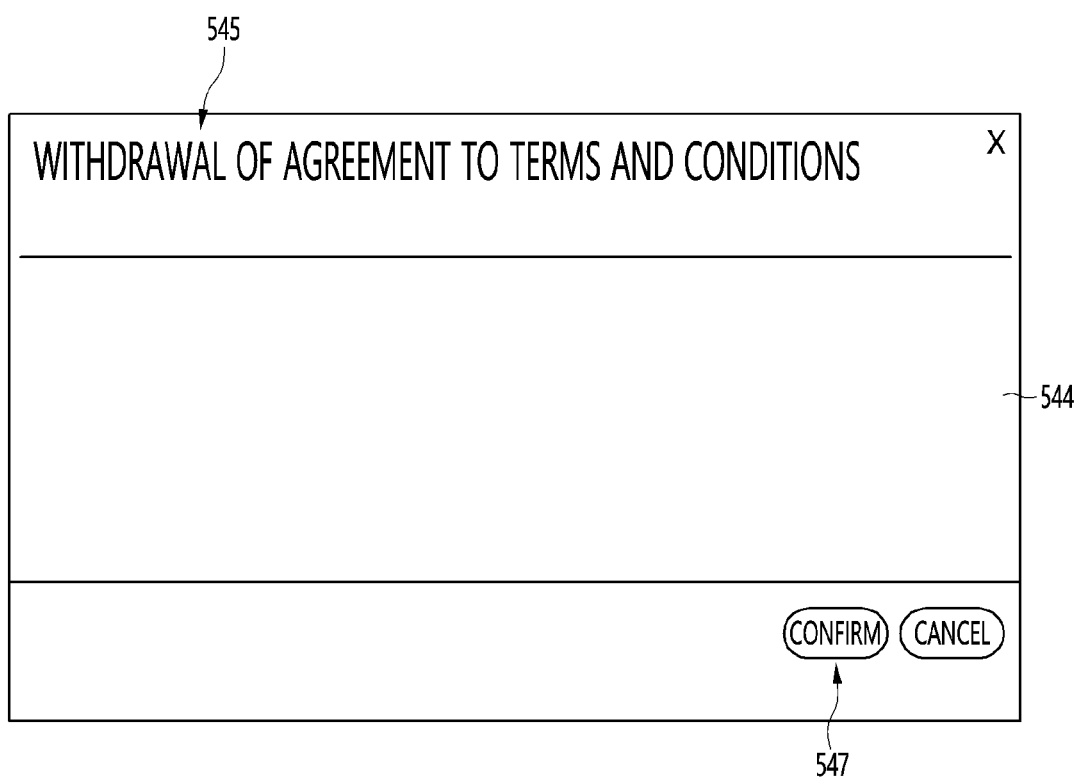
FIG. 19B illustrates a screen displaying withdrawal of agreement to the terms and conditions.

On the other hand, there are cases in which the same label information is obtained in spite of events for different operations. For example, the execution screen of FIG. 19A can be an execution screen 540 related to agreement to the terms and conditions, whereas the execution screen of FIG. 19B can be an execution screen 544 related to withdrawal of agreement to the terms and conditions. In this case, both the execution screen 540 of FIG. 19A and the execution screen 544 of FIG. 19B can display the same button items 543 and 547 indicating the same confirmation event. In this case, when the controller 170 receives a command for selecting each of a button item S430 and a button item 547, it may be difficult for the controller 170 to log the corresponding event that does not recognize information on agreement to the terms and conditions or withdrawal of agreement to the terms and conditions.

In an embodiment, when the same button items 543 and 547 are displayed on the execution screens 540 and 544 including different information so as to solve this problem, the label information corresponding to the button items 543 and 547 as well as information related to the corresponding execution screens 540 and 544, label information corresponding to the button items 543 and 547 and information related to the corresponding execution screens 540 and 544 can be obtained, and log information on the operation of the event corresponding to the button items 543 and 547 can be obtained so as to match the corresponding execution screens 540 and 544.

This will be described in more detail with reference to FIGS. 18 to 20B.

Figure 18:
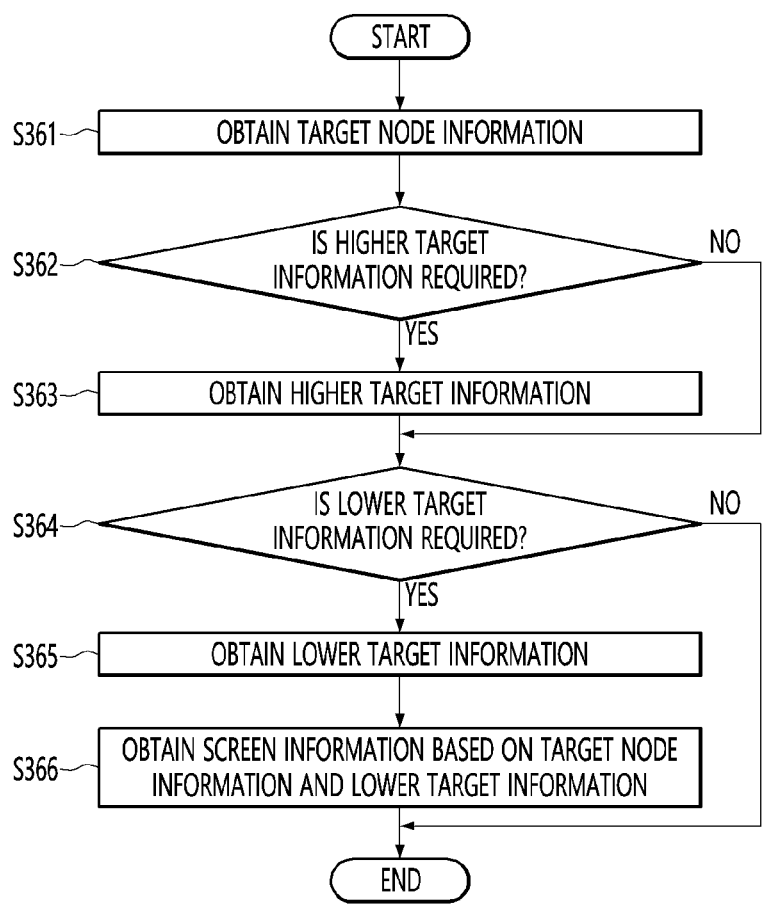
FIG. 18 is a flowchart for describing a method of obtaining label information by using a target node.

FIG. 18 is a flowchart for describing a method of obtaining label information by using a target node.

Referring to FIGS. 1, 13 and 18, the controller 170 can obtain target node information (S361).

The target node information can be node information for obtaining label information. For example, as illustrated in FIGS. 20A and 20B, label information 553 and 557 of 'confirm' can be obtained as target node information.

The controller 170 can obtain whether higher target information is required (S362).

The controller 170 can obtain whether higher target information is present by inquiring the vicinity of the target node information in the configuration file. If the higher target information is present, the controller 170 can recognize that the higher target information is required.

The controller 170 can obtain higher target information (S363).

When the higher target information is required, the controller 170 can obtain the higher target information by inquiring the vicinity of the target node information in the configuration file. For example, as illustrated in FIG. 20A, the controller 170 can obtain 'panel', which is the higher target information 551, by inquiring the vicinity of the target node information 553 and 557 called 'label'. As illustrated in FIG. 20B, the controller 170 can obtain 'popup', which is the higher target information 555, by inquiring the vicinity of the target node information 553 and 557 called 'label'.

The controller 170 can obtain whether lower target information is required (S364).

For example, the controller 170 can obtain whether the following target node information related to the higher target information is present. When the lower target information is present, the controller 170 can recognize that the lower target information is required.

The controller 170 can obtain lower target information (S365).

When the lower target information is required, the controller 170 can obtain the lower target information by inquiring the vicinity of the higher target information in the configuration file. For example, as illustrated in FIG. 20A, the controller 170 can obtain 'agreement to the terms and conditions', which is the lower target information 552, by inquiring the vicinity of the higher target information 551 called 'panel'. For example, as illustrated in FIG. 20B, the controller 170 can obtain 'withdrawal of agreement to the terms and conditions', which is the lower target information 556, by inquiring the vicinity of the higher target information 555 called 'popup'.

The controller 170 can obtain screen information based on the target node information and the lower target information (S366).

As illustrated in FIG. 20A, the controller 170 can recognize that the screen is a screen regarding agreement to the terms and conditions through the lower target information 552 of 'agreement to terms and conditions'. As illustrated in FIG. 20B, the controller 170 can recognize that the screen is a screen regarding withdrawal of agreement to the terms and conditions through the lower target information 556 of 'withdrawal of agreement to terms and conditions'.

Thereafter, the controller 170 can obtain log information on the operation of the corresponding event based on the target node information and the lower target information. For example, as illustrated in FIG. 20A, the controller 170 can obtain log information related to 'agreement to the terms and conditions' has been confirmed' based on the target node information 553 of 'confirm' and the lower target information 552 of 'agreement to the terms and conditions'. For example, as illustrated in FIG. 20B, the controller 170 can obtain log information related to 'withdrawal of agreement to terms and conditions has been confirmed' based on the target node information 557 of 'confirm' and the lower target information 556 of 'withdrawal of agreement to the terms and conditions'.

The above description is merely illustrative of the technical spirit embodiment, and various modifications and changes can be made by those of ordinary skill in the art, without departing from the scope of the present disclosure.

Therefore, the embodiments disclosed in the present disclosure are not intended to limit the technical spirit of the present disclosure, but are intended to explain the technical spirit of the present disclosure. The scope of the technical spirit of the present disclosure is not limited by these embodiments.

The scope of the present disclosure should be interpreted by the appended claims, and all technical ideas within the scope equivalent thereto should be construed as falling within the scope of the present disclosure.

INDUSTRIAL APPLICABILITY

The embodiment can be used in a device or apparatus including a display device.

The invention claimed is:

1. A display device comprising:
a display configured to display an execution screen of an application;

a network interface configured to receive logging configuration information related to the application; and
a controller,
wherein the controller is configured to:
update the received logging configuration information in a configuration file;
when an event for the execution screen of the application occurs, obtain logging item information for logging an operation of the event from the updated configuration file; and
obtain log information related to the operation of the event by using the obtained logging item information,
wherein when the logging item information is obtained, the controller is configured to capture the execution screen corresponding to the event, obtain a data structure corresponding to the captured execution screen, obtain a target node including label information through analyzing the data structure, obtain representative character string information corresponding to the label information of the target node, obtain unique character string information corresponding to the representative character string information, and
obtain the logging item information including the representative character string information and the unique character string information.

2. The display device of claim 1, wherein the received logging configuration information includes additional information of a logging item or deletion information of the logging item.

3. The display device of claim 1, wherein the controller is configured to control the network interface to receive the logging configuration information when power of the display device is turned on.

4. The display device of claim 1, wherein the controller is configured to obtain log information related to the operation of the event when the logging item information for logging the operation of the event is obtained from the configuration file.

5. The display device of claim 1, wherein the controller is configured not to obtain the log information related to the operation of the event when the logging item information for logging the operation of the event is not obtained from the configuration file.

6. The display device of claim 1, wherein the controller is configured to:
when the application is executed, initialize logging by using a library file;
when an event for the execution screen of the application occurs, obtain label information on to the operation of the event; and
obtain representative character string information corresponding to the obtained label information by using a plurality of multilingual tables.

7. The display device of claim 6, wherein the controller is configured to:
when the application is executed, obtain language information set in the display device;
obtain one of the plurality of multilingual tables based on the language information; and
obtain representative character string information corresponding to the obtained label information from the obtained multilingual table.

8. The display device of claim 6, wherein the controller is configured to:
obtain unique character string information corresponding to the representative character string information from the configuration file; and
obtain log information related to the operation of the event by using the obtained unique character string information.

9. The display device of claim 6, wherein the plurality of multilingual tables are provided for each country or language, and
wherein each of the plurality of multilingual tables includes a plurality of pieces of label information and representative character string information corresponding to each of the plurality of pieces of label information.

10. The display device of claim 6, wherein the label information is text of a specific language, and
wherein the representative character string information is text of a common language.

11. An operating method of a display device, the method comprising:
receiving logging configuration information related to an application and updating the received logging configuration information in a configuration file;
when an event for an execution screen of the application occurs, obtaining logging item information for logging an operation of the event from the updated configuration file; and
obtaining log information related to the operation of the event by using the obtained logging item information,
wherein when obtaining the logging item information occurs, the method further comprises:
capturing the execution screen corresponding to the event,
obtaining a data structure corresponding to the captured execution screen,
obtaining a target node including label information through analyzing the data structure,
obtaining representative character string information corresponding to the label information of the target node, obtain unique character string information corresponding to the representative character string information, and
obtaining the logging item information including the representative character string information and the unique character string information.

12. The method of claim 11, wherein the received logging configuration information includes additional information of a logging item or deletion information of the logging item.

13. The method of claim 11, wherein the updating comprises receiving the logging configuration information when power of the display device is turned on.

14. The method of claim 11, wherein The obtaining of the log information comprises, when logging item information for logging the operation of the event is obtained from the configuration file, obtaining the log information related to the operation of the event.

15. The method of claim 11, wherein the obtaining of the log information comprises, when logging item information for logging the operation of the event is not obtained from the configuration file, not obtaining the log information related to the operation of the event.

16. The method of claim 11, wherein the obtaining of the log information comprises:
when the application is executed, initializing logging by using a library file;
when an event for the execution screen of the application occurs, obtaining label information on the operation of the event; and
obtaining representative character string information corresponding to the obtained label information by using a plurality of multilingual tables.

17. The method of claim 16, wherein the obtaining of the representative character string information comprises:
    when the application is executed, obtaining language information set in the display device;
    obtaining one of the plurality of multilingual tables based on the language information; and
    obtaining representative character string information corresponding to the obtained label information from the obtained multilingual table.

18. The method of claim 16, wherein the obtaining of the log information further comprises:
    obtaining unique character string information corresponding to the obtained representative character string information from the configuration file; and
    obtaining log information related to the operation of the event by using the obtained unique character string information.

\* \* \* \* \*